United States Patent
Choi et al.

(10) Patent No.: US 11,464,024 B2
(45) Date of Patent: Oct. 4, 2022

(54) TECHNIQUES FOR SHARING SIDELINK RESOURCE

(71) Applicant: QUALCOMM Incorporated, San Diego, CA (US)

(72) Inventors: Chang-Sik Choi, Hillsborough, NJ (US); Kapil Gulati, Belle Mead, NJ (US); Sudhir Kumar Baghel, Hillsborough, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 17/171,394

(22) Filed: Feb. 9, 2021

(65) Prior Publication Data

US 2021/0266918 A1 Aug. 26, 2021

Related U.S. Application Data

(60) Provisional application No. 62/979,861, filed on Feb. 21, 2020.

(51) Int. Cl.
*H04W 72/10* (2009.01)

(52) U.S. Cl.
CPC .................. *H04W 72/10* (2013.01)

(58) Field of Classification Search
CPC . H04W 72/02; H04W 72/0406; H04W 72/06; H04W 72/085; H04W 72/10; H04W 76/14; H04W 88/04
See application file for complete search history.

(56) References Cited

U.S. PATENT DOCUMENTS

2016/0255554 A1* 9/2016 Ke .................. H04W 48/16
455/436
2016/0337935 A1* 11/2016 Patil .................. H04L 5/0048
(Continued)

FOREIGN PATENT DOCUMENTS

EP 3282767 A1 2/2018
EP 3451563 A1 3/2019
(Continued)

OTHER PUBLICATIONS

"3rd Generation Partnership Project, Technical Specification Group Radio Access Network, Overall Description of Radio Access Network (RAN) aspects for Vehicle-to-everything (V2X) based on LTE and NR (Release 16)", 3GPP Standard, Technical Report, 3GPP TR 37.985, V1.1.0, 3rd Generation Partnership Project (3GPP), Mobile Competence Centre, 650, Route Des Lucioles, F-06921 Sophia-Antipolis Cedex, France, vol. RAN WG1. No. 1.1.0, Feb. 15, 2020 (Feb. 15, 2020), pp. 1-34, XP051860914, Retrieved from the Internet: URL: ftp://ftp.3gpp.org/Specs/archive/37_series/37.985/37985-110.zip. draft TR 37.985 v1.1.0.docx. [retrieved on Feb. 15, 2020] p. 14. line 30-line 52.
(Continued)

*Primary Examiner* — Kashif Siddiqui
(74) *Attorney, Agent, or Firm* — Dalei Dong; Harrity & Harrity, LLP (57) ABSTRACT

Various aspects of the present disclosure generally relate to wireless communication. In some aspects, a recipient user equipment (UE) of a sidelink resource sharing system may receive, from a plurality of provider UEs, resource information associated with the plurality of provider UEs; select, based at least in part on a ranked order and the resource information, one or more resources associated with one or more selected UEs, of the plurality of provider UEs, wherein the ranked order is based at least in part on measurement information, determined by the recipient UE, associated
(Continued)

with the plurality of provider UEs; and perform a sidelink communication using the one or more resources. Numerous other aspects are provided.

30 Claims, 5 Drawing Sheets

(56) References Cited

U.S. PATENT DOCUMENTS

| | | | | |
|---|---|---|---|---|
| 2016/0338094 A1* | 11/2016 | Faurie | ............... | H04W 72/14 |
| 2016/0338095 A1* | 11/2016 | Faurie | ............... | H04W 72/14 |
| 2018/0123682 A1* | 5/2018 | Jung | ............... | H04W 40/22 |
| 2018/0152915 A1* | 5/2018 | Kalhan | ............... | H04W 88/04 |
| 2018/0206176 A1* | 7/2018 | Panteleev | ......... | H04W 72/1231 |
| 2019/0053204 A1* | 2/2019 | Lien | ............... | H04L 1/0023 |
| 2019/0182840 A1* | 6/2019 | Feng | ............... | H04W 72/06 |
| 2019/0387377 A1* | 12/2019 | Zhang | ............... | H04W 84/005 |
| 2021/0307094 A1* | 9/2021 | Agiwal | ............... | H04W 8/005 |

FOREIGN PATENT DOCUMENTS

| | | |
|---|---|---|
| WO | WO-2016182653 A1 | 11/2016 |
| WO | WO-2018027528 A1 | 2/2018 |

OTHER PUBLICATIONS

International Search Report and Written Opinion—PCT/US2021/017454—ISA/EPO—dated May 26, 2021.

* cited by examiner

TECHNIQUES FOR SHARING SIDELINK RESOURCE

CROSS-REFERENCE TO RELATED APPLICATION

This patent application claims priority to U.S. Provisional Patent Application No. 62/979,861, filed on Feb. 21, 2020, entitled "TECHNIQUES FOR SHARING SIDELINK RESOURCE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sharing a sidelink resource.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a recipient user equipment (UE) of a sidelink resource sharing system, may include receiving, from a plurality of provider UEs, resource information associated with the plurality of provider UEs; selecting, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; and performing a sidelink communication using the one or more resources.

In a first aspect, the resource information includes respective resource maps associated with the plurality of provider UEs, and selecting the one or more resources further comprises selecting the one or more resources from one or more resource maps, of the respective resource maps, associated with the one or more selected UEs.

In a second aspect, alone or in combination with the first aspect, the method includes selecting the one or more selected UEs based at least in part on the ranked order.

In a third aspect, alone or in combination with one or more of the first and second aspects, the one or more selected UEs include a highest-ranked UE according to the ranked order.

In a fourth aspect, alone or in combination with one or more of the first through third aspects, the one or more selected UEs include a highest-ranked set of UEs according to the ranked order.

In a fifth aspect, alone or in combination with one or more of the first through fourth aspects, the one or more resources are selected from a coherent combination of resource information associated with the highest-ranked set of UEs.

In a sixth aspect, alone or in combination with one or more of the first through fifth aspects, the measurement information identifies respective reference signal received power (RSRP) values of the plurality of provider UEs.

In a seventh aspect, alone or in combination with one or more of the first through sixth aspects, the method includes determining an average value for a provider UE, of the plurality of provider UEs, using the measurement information, wherein the ranked order and selection of the one or more is selecting UEs are based at least in part on the average value.

In an eighth aspect, alone or in combination with one or more of the first through seventh aspects, the one or more selected UEs are selected based at least in part on the measurement information associated with the one or more selected UEs satisfying a threshold.

In a ninth aspect, alone or in combination with one or more of the first through eighth aspects, the method includes determining the ranked order based at least in part on the measurement information.

In a tenth aspect, alone or in combination with one or more of the first through ninth aspects, the method includes determining the measurement information.

In an eleventh aspect, alone or in combination with one or more of the first through tenth aspects, the resource information is received in a control signal.

In some aspects, a recipient UE of a sidelink resource sharing system may include a memory and one or more processors operatively coupled to the memory. The memory and the one or more processors may be configured to receive, from a plurality of provider UEs, resource information associated with the plurality of provider UEs; select, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; and perform a sidelink communication using the one or more resources.

In a first aspect, the resource information includes respective resource maps associated with the plurality of provider UEs, and selecting the one or more resources further comprises selecting the one or more resources from one or more resource maps, of the respective resource maps, associated with the one or more selected UEs.

In a second aspect, alone or in combination with the first aspect, the recipient UE is configured to select the one or more selected UEs based at least in part on the ranked order.

In a third aspect, alone or in combination with one or more of the first and second aspects, the one or more selected UEs include a highest-ranked UE according to the ranked order.

In a fourth aspect, alone or in combination with one or more of the first through third aspects, the one or more selected UEs include a highest-ranked set of UEs according to the ranked order.

In a fifth aspect, alone or in combination with one or more of the first through fourth aspects, the one or more resources are selected from a coherent combination of resource information associated with the highest-ranked set of UEs.

In a sixth aspect, alone or in combination with one or more of the first through fifth aspects, the measurement information identifies respective reference signal received power (RSRP) values of the plurality of provider UEs.

In a seventh aspect, alone or in combination with one or more of the first through sixth aspects, the recipient UE is configured to determine an average value for a provider UE, of the plurality of provider UEs, using the measurement information, wherein the ranked order and selection of the one or more is selecting UEs are based at least in part on the average value.

In an eighth aspect, alone or in combination with one or more of the first through seventh aspects, the one or more selected UEs are selected based at least in part on the measurement information associated with the one or more selected UEs satisfying a threshold.

In a ninth aspect, alone or in combination with one or more of the first through eighth aspects, the recipient UE is configured to determine the ranked order based at least in part on the measurement information.

In a tenth aspect, alone or in combination with one or more of the first through ninth aspects, the recipient UE is configured to determine the measurement information.

In an eleventh aspect, alone or in combination with one or more of the first through tenth aspects, the resource information is received in a control signal.

In some aspects, a non-transitory computer-readable medium may store one or more instructions for wireless communication. The one or more instructions, when executed by one or more processors of a recipient UE of a sidelink resource sharing system, may cause the one or more processors to receive, from a plurality of provider UEs, resource information associated with the plurality of provider UEs; select, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; and perform a sidelink communication using the one or more resources.

In a first aspect, the resource information includes respective resource maps associated with the plurality of provider UEs, and selecting the one or more resources further comprises selecting the one or more resources from one or more resource maps, of the respective resource maps, associated with the one or more selected UEs.

In a second aspect, alone or in combination with the first aspect, the one or more instructions cause the one or more processors to select the one or more selected UEs based at least in part on the ranked order.

In a third aspect, alone or in combination with one or more of the first and second aspects, the one or more selected UEs include a highest-ranked UE according to the ranked order.

In a fourth aspect, alone or in combination with one or more of the first through third aspects, the one or more selected UEs include a highest-ranked set of UEs according to the ranked order.

In a fifth aspect, alone or in combination with one or more of the first through fourth aspects, the one or more resources are selected from a coherent combination of resource information associated with the highest-ranked set of UEs.

In a sixth aspect, alone or in combination with one or more of the first through fifth aspects, the measurement information identifies respective reference signal received power (RSRP) values of the plurality of provider UEs.

In a seventh aspect, alone or in combination with one or more of the first through sixth aspects, the one or more instructions cause the one or more processors to determine an average value for a provider UE, of the plurality of provider UEs, using the measurement information, wherein the ranked order and selection of the one or more is selecting UEs are based at least in part on the average value.

In an eighth aspect, alone or in combination with one or more of the first through seventh aspects, the one or more selected UEs are selected based at least in part on the measurement information associated with the one or more selected UEs satisfying a threshold.

In a ninth aspect, alone or in combination with one or more of the first through eighth aspects, the one or more instructions cause the one or more processors to determine the ranked order based at least in part on the measurement information.

In a tenth aspect, alone or in combination with one or more of the first through ninth aspects, the one or more instructions cause the one or more processors to determine the measurement information.

In an eleventh aspect, alone or in combination with one or more of the first through tenth aspects, the resource information is received in a control signal.

In some aspects, an apparatus for wireless communication may include means for receiving, from a plurality of provider UEs, resource information associated with the plurality of provider UEs; means for selecting, based at least in part on a ranked order and the resource information, one or more resources associated with one or more selected UEs, of the plurality of provider UEs, wherein the ranked order is based at least in part on measurement information, determined by the apparatus, associated with the plurality of provider UEs; and means for performing a sidelink communication using the one or more resources.

In a first aspect, the resource information includes respective resource maps associated with the plurality of provider UEs, and selecting the one or more resources further comprises selecting the one or more resources from one or more resource maps, of the respective resource maps, associated with the one or more selected UEs.

In a second aspect, alone or in combination with the first aspect, the method includes selecting the one or more selected UEs based at least in part on the ranked order.

In a third aspect, alone or in combination with one or more of the first and second aspects, the one or more selected UEs include a highest-ranked UE according to the ranked order.

In a fourth aspect, alone or in combination with one or more of the first through third aspects, the one or more selected UEs include a highest-ranked set of UEs according to the ranked order.

In a fifth aspect, alone or in combination with one or more of the first through fourth aspects, the one or more resources are selected from a coherent combination of resource information associated with the highest-ranked set of UEs.

In a sixth aspect, alone or in combination with one or more of the first through fifth aspects, the measurement information identifies respective reference signal received power (RSRP) values of the plurality of provider UEs.

In a seventh aspect, alone or in combination with one or more of the first through sixth aspects, the method includes determining an average value for a provider UE, of the plurality of provider UEs, using the measurement information, wherein the ranked order and selection of the one or more is selecting UEs are based at least in part on the average value.

In an eighth aspect, alone or in combination with one or more of the first through seventh aspects, the one or more selected UEs are selected based at least in part on the measurement information associated with the one or more selected UEs satisfying a threshold.

In a ninth aspect, alone or in combination with one or more of the first through eighth aspects, the method includes determining the ranked order based at least in part on the measurement information.

In a tenth aspect, alone or in combination with one or more of the first through ninth aspects, the method includes determining the measurement information.

In an eleventh aspect, alone or in combination with one or more of the first through tenth aspects, the resource information is received in a control signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
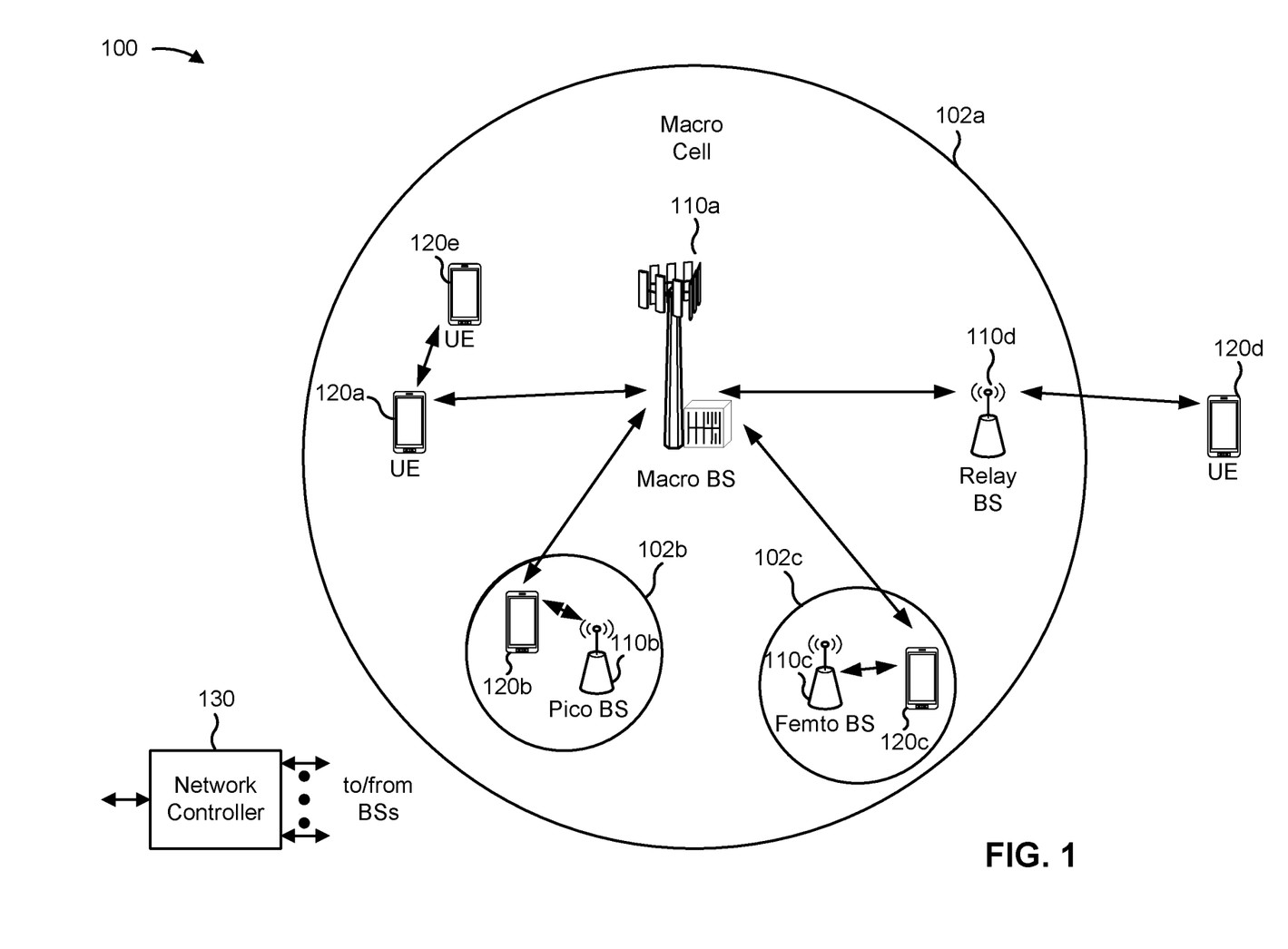
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
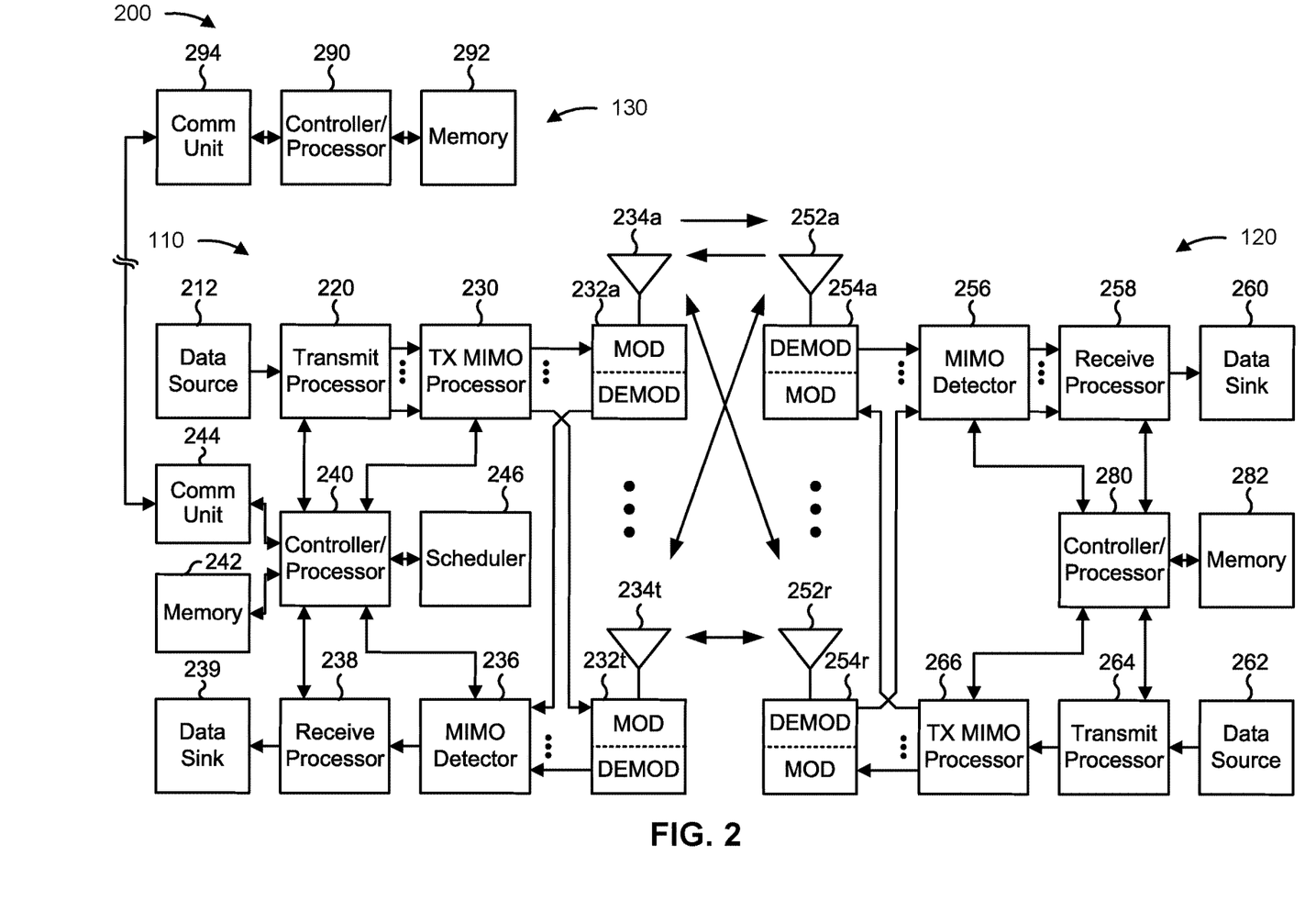
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with sidelink resource sharing, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, and/or interpreting the instructions.

In some aspects, UE 120 may include means for receiving, from a plurality of provider UEs, resource information associated with the plurality of provider UEs; means for selecting, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; means for performing a sidelink communication using the one or more resources; means for selecting the one or more selected UEs based at least in part on the ranked order; means for determining an average value for a provider UE, of the plurality of provider UEs, using the measurement information, wherein the ranked order and selection of the one or more selected UEs are based at least in part on the average value; means for determining the ranked order based at least in part on the measurement information; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, vehicles may communicate directly with each other using sidelink communications (e.g., device-to-device (D2D) communications over a D2D wireless link).

To improve the reliability of sidelink transmissions, UEs may inter-coordinate to share resource information. That is, a first UE (referred to herein as a provider UE) may identify communications resources by sensing surroundings of the first UE. The communications resources identified by the first UE may be identified by resource information, such as a resource map. These communications resources may also be referred to as sensing information. The first UE may transmit the resource information (e.g., identified communications resources) to a second UE, referred to herein as a recipient UE. The recipient UE may consider the resource information when selecting resources for a sidelink transmission.

However, the resource information from one provider UE may be more useful to the recipient UE than the resource information from another provider UE. For example, if a provider UE is in a substantially different environment than the recipient UE (for example, due to distance between the provider UE and the recipient UE, different blockers or surroundings associated with the provider UE and the recipient UE, and/or the like), then resource information provided by the provider UE may be sub-optimal or even detrimental to performance of the recipient UE. Irrelevant or non-useful resource information may be particularly problematic for a recipient UE that does not perform its own sensing operations, such as a low-power UE, a battery-limited UE, a UE associated with a heavy duty cycle, and/or the like.

Some techniques and apparatuses described herein provide selection of resources based at least in part on a measurement associated with a provider UE from which corresponding resource information was received. For example, a recipient UE may determine measurements (e.g., RSRP measurements and/or the like) for provider UEs from which resource information is received. The recipient UE may select a selected provider UE (e.g., a top provider UE) or a selected set of provider UEs (e.g., a top set of provider UEs) based at least in part on the measurements. For example, the recipient UE may select a top set of provider UEs associated with strongest RSRP measurements. The recipient UE may select one or more resources from resource information associated with the top set of provider UEs. Thus, the recipient UE may identify resources associated with a provider UE that is located close to the UE, which improves likelihood that the resource information of the selected provider UE is accurate and/or useful for the recipient UE. Thus, communication performance of the recipient UE is improved, thereby conserving computing resources of the recipient UE that would otherwise be used in association with an inaccurate or irrelevant resource map.

Figure 3:
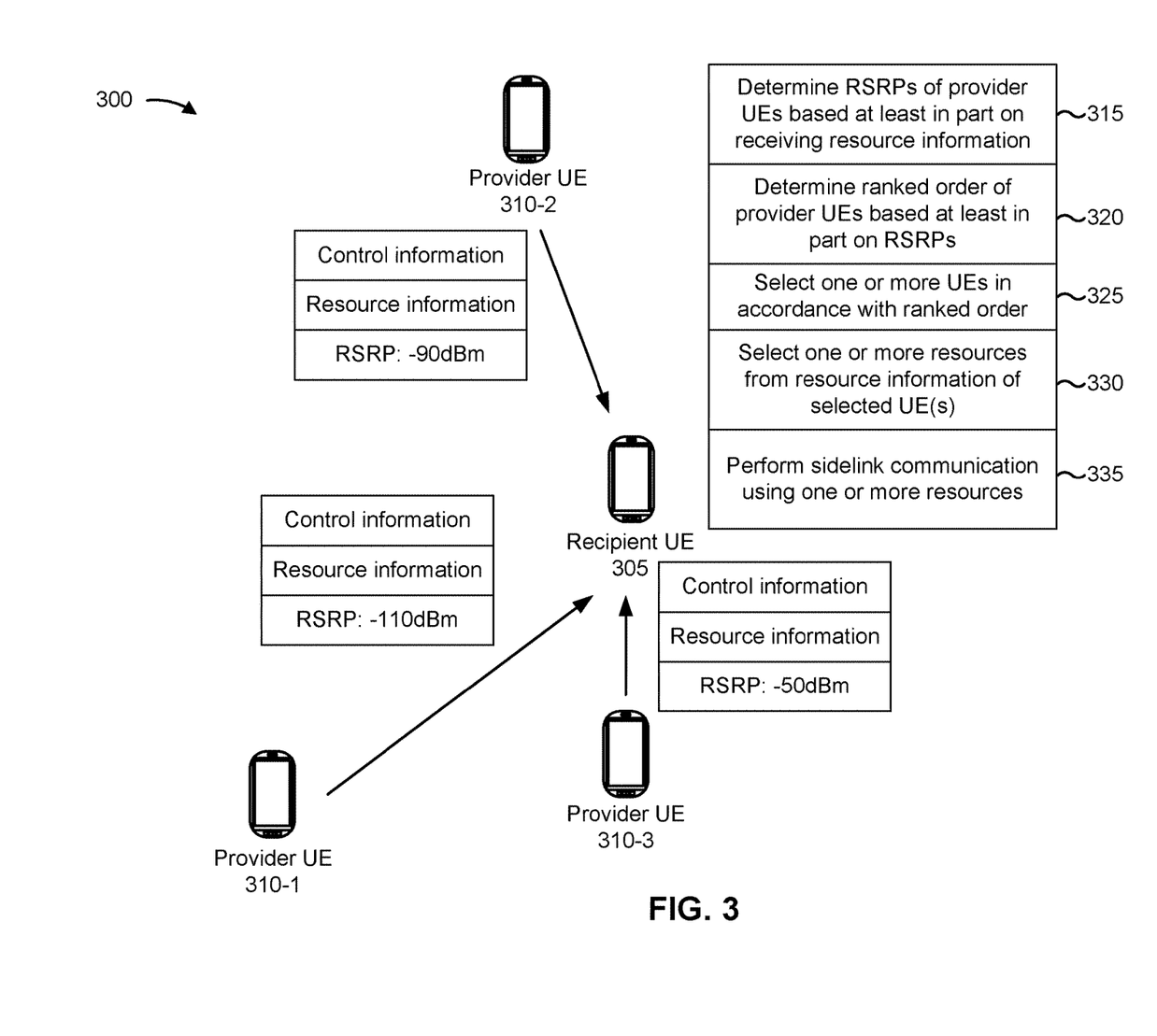
FIG. 3 is a diagram illustrating an example of sidelink resource sharing, in accordance with the present disclosure.

FIG. 3 is a diagram illustrating an example 300 of sidelink resource sharing, in accordance with the present disclosure. As shown, FIG. 3 includes a recipient UE 305 and a set of provider UEs 310-1, 310-2, and 310-3. Recipient UE 305 may be a UE 120. In some aspects, recipient UE 305 may be a low-power UE, an IoT UE, a reduced capability UE, and/or the like. In some aspects, recipient UE 305 may perform the operations described in connection with FIG. 3 based at least in part on recipient UE 305 being a low-power UE, an IoT UE, a reduced capability UE, and/or the like. In some aspects, recipient UE 305 may perform the operations described in connection with FIG. 3 based at least in part on recipient UE 305 being configured or determining not to perform a sensing operation to determine a resource map.

Provider UE 310 may be a UE 120. As shown, different provider UEs 310 may be different distances from recipient UE 305. For example, provider UE 310-3 is closer than provider UE 310-1 or provider UE 310-2. Recipient UE 305 and provider UEs 310 may be part of a sidelink resource sharing system, meaning that recipient UE 305 and provider UEs 310 may share resources for sidelink transmissions between recipient UE 305 and provider UEs 310 and/or to or from other devices.

As shown in FIG. 3, provider UEs 310-1 through 310-3 may provide control information to recipient UE 305. As further shown, the control information may include resource information determined by the corresponding provider UE 310. For example, each provider UE 310, of the plurality of provider UEs 310 shown in FIG. 3, may determine respective resource information. The resource information may include a resource map, sensing information, and/or the like. For example, the resource information may identify available resources for sidelink communication by the corresponding provider UE 310. The control information may include, for example, a physical sidelink shared channel (PSSCH), sidelink control information (SCI), and/or the like. In some aspects, the control information may be provided on a sidelink interface between the UEs 305/310, such as a ProSe Sidelink (PC5) interface and/or the like.

As shown by reference number 315, recipient UE 305 may determine measurements (e.g., measurement values such as RSRPs) of the provider UEs based at least in part on receiving the resource information. For example, recipient UE 305 may determine the measurements based at least in part on the control information. Here, the measurements include RSRP values, though the measurements may be any form of measurement that can be determined by recipient UE 305. As shown, the control information received from provider UE 310-3 is associated with a strongest RSRP value (e.g., −50 decibel-milliwatts (dBm)), followed by the control information from provider UE 310-2 then the control information from provider UE 310-1.

In some aspects, recipient UE 305 determines a measurement over time. For example, recipient UE 305 may store measurement information pertaining to a provider UE 310. In some aspects, recipient UE 305 may determine a combined measurement value for provider UE 310, such as an average measurement over a time window (e.g., a time-averaged value), a highest measurement in a time window, a lowest measurement in a time window, a median measurement in a time window, a deviation or variance of a measurement in a time window, and/or the like. Recipient UE 305 may use such an combined measurement value to determine the ranked order and/or grouping of provider UEs 310. By determining an aggregated measurement, fadings may be averaged out, and link-budget data for the RSRP may be determined, which may be useful for network configuration and scheduling purposes.

As shown by reference number 320, recipient UE 305 may determine a ranked order of provider UEs 310 based at least in part on the measurements (e.g., the RSRPs). For example, recipient UE 305 may assign provider UE 310-3 a highest rank, provider UE 310-2 an intermediate rank, and provider UE 310-1 a lowest rank, in accordance with the respective RSRP values of the provider UEs 310. In some aspects, recipient UE 305 may divide the plurality of provider UEs 310 into two or more sets based at least in part on the measurements, such as a first set that satisfies a threshold (indicating that resource information for the first set is usable by recipient UE 305) and a second set that fails to satisfy the threshold (indicating that resource information for the second set is not usable by recipient UE 305).

As shown by reference number 325, recipient UE 305 may select one or more UEs in accordance with the ranked order. For example, recipient UE 305 may select a highest-ranked provider UE 310, a highest-ranked N provider UEs 310 (where N is an integer greater than or equal to 1), all provider UEs 310 of the first set described above, and/or the like. Recipient UE 305 may use resource information associated with the one or more selected UEs to select a resource for a sidelink communication. For example, the one or more selected UEs may be closer to recipient UE 305 or associated with a more direct channel to recipient UE 305 than lower-ranked UEs 310, thus meaning that resource information associated with the one or more selected UEs is likely to be more accurate and/or useful for recipient UE 305 than resource information associated with lower-ranked UEs 310.

As shown by reference number 330, recipient UE 305 may select one or more resources from resource information of the one or more selected UEs. For example, recipient UE 305 may select a resource for a sidelink communication. In some aspects, the sidelink communication may be between recipient UE 305 and the UE from which resource information identifying the selected resource was received. In some aspects, the sidelink communication may be between recipient UE 305 and another device (e.g., another UE, a road-side unit, a base station, and/or the like). In some aspects, the sidelink communication may be a broadcast communication of recipient UE 305. As shown by reference number 335, recipient UE 305 may perform the sidelink communication using the one or more selected resources.

In some aspects, recipient UE 305 may select a resource based at least in part on combined resource information. For example, recipient UE 305 may combine resource information of two or more provider UEs 310 (e.g., a highest-ranked two or more provider UEs 310, two or more provider UEs 310 of the first set, and/or the like). In some aspects, recipient UE 305 may combine resource information based at least in part on the resource information of a pair of providers UE 310 being coherently combinable. As used herein, "coherently combinable" may refer to resource information that uses a same format, a same ordering or numbering system, and/or the like, such that the resource information can be combined using a union operation, an additive operation, and/or the like. Thus, recipient UE 305 may use combined resource information to select a resource, which may provide more accurate and complete resource information regarding a channel surrounding recipient UE 305, thereby improving accuracy of resource selection.

As indicated above, FIG. 3 is provided as an example. Other examples may differ from what is described with respect to FIG. 3.

Figure 4:
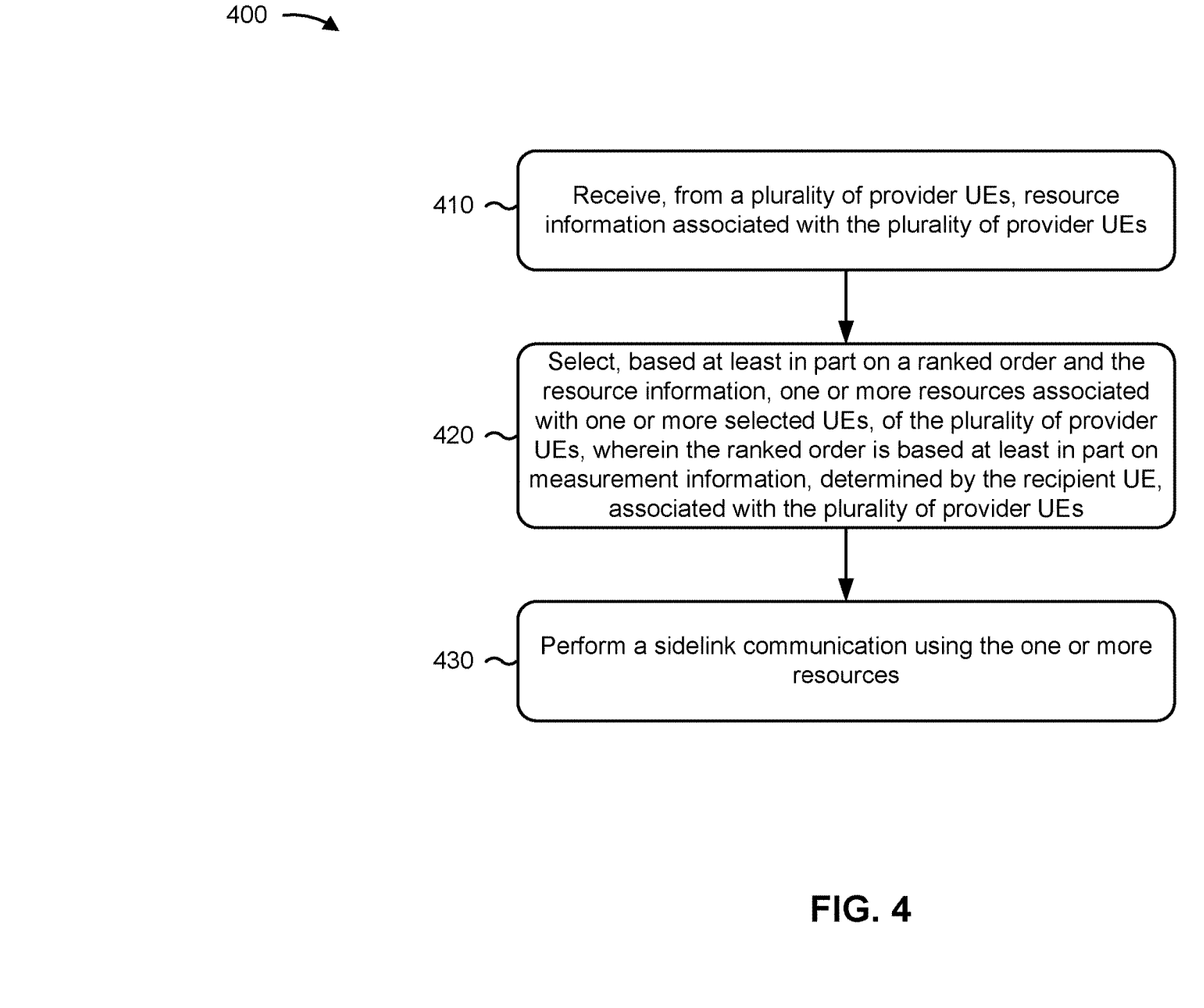
FIG. 4 is a diagram illustrating an example process performed, for example, by a user equipment, in accordance with the present disclosure.

FIG. 4 is a diagram illustrating an example process 400 performed, for example, by a UE, in accordance with the present disclosure. Example process 400 is an example where a recipient UE (e.g., UE 120, recipient UE 305, and/or the like) performs operations associated with sidelink resource sharing.

As shown in FIG. 4, in some aspects, process 400 may include receiving, from a plurality of provider UEs, resource information associated with the plurality of provider UEs (block 410). For example, the recipient UE (e.g., using antenna 252, DEMOD 254, MIMO detector 256, receive processor 258, controller/processor 280, and/or the like) may receive, from a plurality of provider UEs (e.g., UE 120, provider UE 310, and/or the like) resource information associated with the plurality of provider UEs, as described above. In some aspects, the techniques described herein can be applied for resource information received from a single provider UE (e.g., the recipient UE may determine whether a measurement associated with the single provider UE satisfies a threshold, and may selectively use the single provider UE's resource information, or determine not to use the single provider UE's resource information, accordingly).

As further shown in FIG. 4, in some aspects, process 400 may include selecting, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs (block 420). For example, the recipient UE (e.g., using controller/processor 280 and/or the like) may select, based at least in part on a ranked order and the resource information, one or more resources associated with one or more selected UEs of the plurality of provider UEs, as described above. In some aspects, the ranked order is based at least in part on measurement information, determined by the recipient UE, associated with the plurality of provider UEs.

As further shown in FIG. 4, in some aspects, process 400 may include performing a sidelink communication using the one or more resources (block 430). For example, the recipient UE (e.g., using controller/processor 280, transmit processor 264, TX MIMO processor 266, MOD 254, antenna 252, and/or the like) may perform a sidelink communication using the one or more resources, as described above.

Process 400 may include additional aspects, such as any single aspect or any combination of aspects described below and/or in connection with one or more other processes described elsewhere herein.

In a first aspect, the resource information includes respective resource maps associated with the plurality of provider UEs, and selecting the one or more resources further comprises selecting the one or more resources from one or more resource maps, of the respective resource maps, associated with the one or more selected UEs.

In a second aspect, alone or in combination with the first aspect, process 400 includes selecting the one or more selected UEs based at least in part on the ranked order.

In a third aspect, alone or in combination with one or more of the first and second aspects, the one or more selected UEs include a highest-ranked UE according to the ranked order.

In a fourth aspect, alone or in combination with one or more of the first through third aspects, the one or more selected UEs include a highest-ranked set of UEs according to the ranked order.

In a fifth aspect, alone or in combination with one or more of the first through fourth aspects, the one or more resources are selected from a coherent combination of resource information associated with the highest-ranked set of UEs.

In a sixth aspect, alone or in combination with one or more of the first through fifth aspects, the measurement information identifies respective reference signal received power (RSRP) values of the plurality of provider UEs.

In a seventh aspect, alone or in combination with one or more of the first through sixth aspects, process 400 includes determining an average value for a provider UE, of the plurality of provider UEs, using the measurement information, wherein the ranked order and selection of the one or more is selecting UEs are based at least in part on the average value.

In an eighth aspect, alone or in combination with one or more of the first through seventh aspects, the one or more selected UEs are selected based at least in part on the measurement information associated with the one or more selected UEs satisfying a threshold.

In a ninth aspect, alone or in combination with one or more of the first through eighth aspects, process 400 includes determining the ranked order based at least in part on the measurement information.

In a tenth aspect, alone or in combination with one or more of the first through ninth aspects, process 400 includes determining the measurement information.

In an eleventh aspect, alone or in combination with one or more of the first through tenth aspects, the resource information is received in a control signal.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
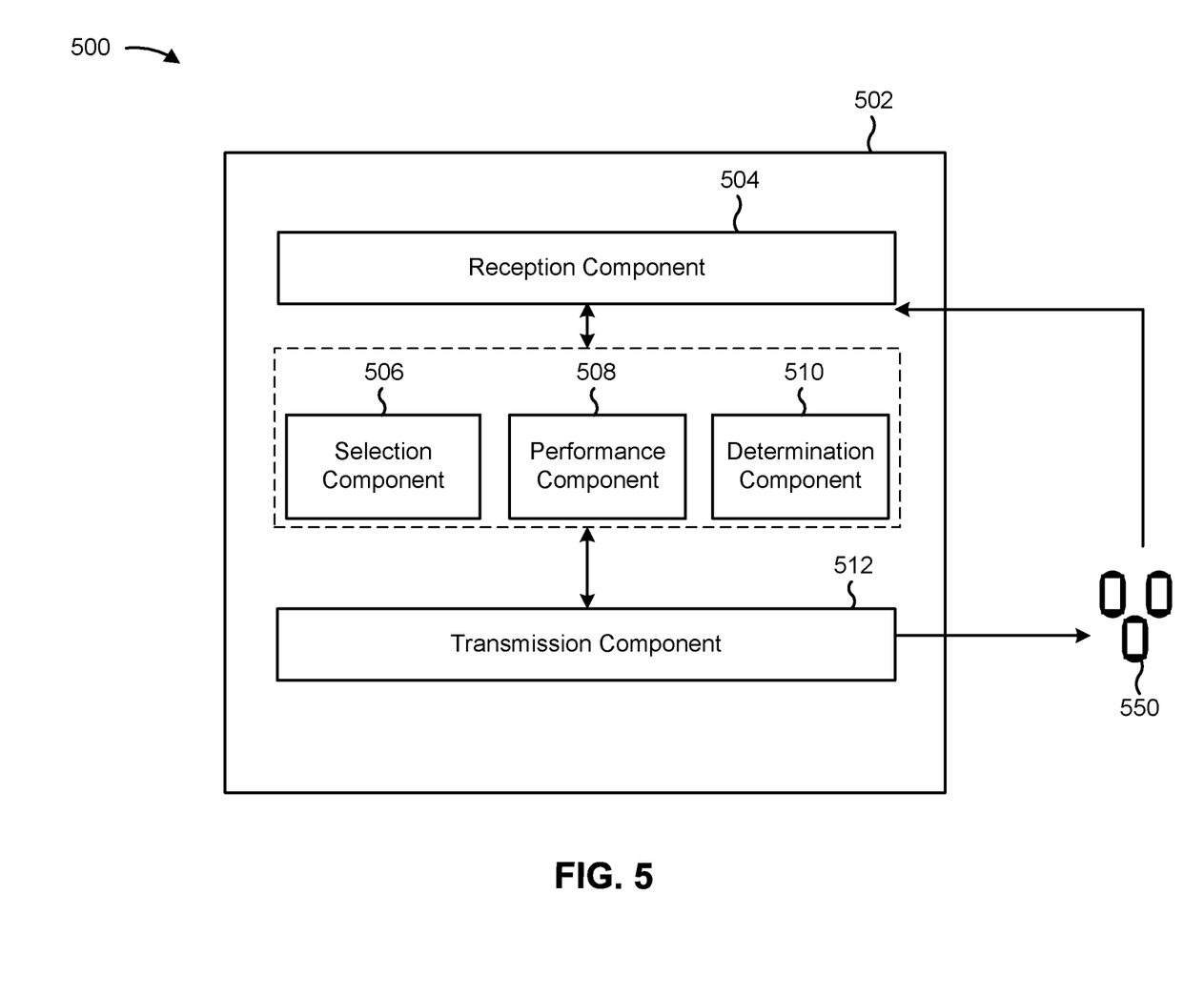
FIG. 5 is a data flow diagram illustrating the data flow between different components in an example apparatus, in accordance with the present disclosure.

FIG. 5 is a data flow diagram 500 illustrating the data flow between different components in an example apparatus 502, in accordance with the present disclosure. The apparatus 502 may be a UE (e.g., UE 120, UE 305). In some aspects, the apparatus 502 includes a reception component 504, a selection component 506, a performance component 508, a determination component 510, and/or a transmission component 512.

The reception component 504 may receive, from a plurality of provider UEs 550 (e.g., UE 120 or UE 310), resource information associated with the plurality of provider UEs. The determination component 510 may determine measurement information based at least in part on the resource information (e.g., based at least in part on control information used to provide the resource information). In some aspects, the determination component 510 may determine a ranked order based at least in part on the measurement information. In some aspects, the determination component 510 may determine an average value for a provider UE, of the plurality of provider UEs 550, using the measurement information, wherein the ranked order and selection of the one or more selected UEs are based at least in part on the average value. The selection component 506 may select, based at least in part on a ranked order and the resource information, one or more resources associated with one or more selected UEs, of the plurality of provider UEs 550, wherein the ranked order is based at least in part on measurement information, determined by the apparatus 502, associated with the plurality of provider UEs 550. The performance component 508 and/or the transmission component 512 may performing a sidelink communication using the one or more resources.

The apparatus may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

The following provides an overview of some Aspects of the present disclosure:

Aspect 1: A method of wireless communication performed by a recipient user equipment (UE) of a sidelink resource sharing system, comprising: receiving, from a plurality of provider UEs, resource information associated with the plurality of provider UEs; selecting, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; and performing a sidelink communication using the one or more resources.

Aspect 2: The method of Aspect 1, wherein the resource information includes respective resource maps corresponding to the plurality of provider UEs, and wherein selecting the one or more resources further comprises selecting the one or more resources from one or more resource maps, of the respective resource maps, associated with the one or more selected UEs.

Aspect 3: The method of any of Aspects 1-2, further comprising: selecting the one or more selected UEs based at least in part on the ranked order.

Aspect 4: The method of any of Aspects 1-3, wherein the one or more selected UEs include a highest-ranked UE according to the ranked order.

Aspect 5: The method of any of Aspects 1-4, wherein the one or more selected UEs include a highest-ranked set of UEs according to the ranked order.

Aspect 6: The method of Aspect 5, wherein the one or more resources are selected from a coherent combination of resource information associated with the highest-ranked set of UEs.

Aspect 7: The method of any of Aspects 1-6, wherein the measurement information identifies respective reference signal received power (RSRP) values of the plurality of provider UEs.

Aspect 8: The method of any of Aspects 1-7, further comprising: determining an combined measurement value for a provider UE, of the plurality of provider UEs, using the measurement information, wherein the ranked order and selection of the one or more selected UEs are based at least in part on the combined measurement value.

Aspect 9: The method of any of Aspects 1-8, wherein the one or more selected UEs are selected based at least in part on the measurement information associated with the one or more selected UEs satisfying a threshold.

Aspect 10: The method of any of Aspects 1-9, further comprising: determining the ranked order based at least in part on the measurement information.

Aspect 11: The method of any of Aspects 1-10, further comprising: determining the measurement information.

Aspect 12: The method of any of Aspects 1-11, wherein the resource information is received in a control signal.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the memory and the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a recipient user equipment (UE) of a sidelink resource sharing system, comprising:
   receiving, from a plurality of provider UEs, resource information associated with the plurality of provider UEs;
   selecting, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; and
   performing a sidelink communication using the one or more resources.

2. The method of claim 1, wherein the resource information includes respective resource maps corresponding to the plurality of provider UEs, and wherein selecting the one or more resources further comprises selecting the one or more resources from one or more resource maps, of the respective resource maps, associated with the one or more selected UEs.

3. The method of claim 1, further comprising:
   selecting the one or more selected UEs based at least in part on the ranked order.

4. The method of claim 1, wherein the one or more selected UEs include a highest-ranked UE according to the ranked order.

5. The method of claim 1, wherein the one or more selected UEs include a highest-ranked set of UEs according to the ranked order.

6. The method of claim 5, wherein the one or more resources are selected from a coherent combination of resource information associated with the highest-ranked set of UEs.

7. The method of claim 1, wherein the measurement information identifies respective reference signal received power (RSRP) values of the plurality of provider UEs.

8. The method of claim 1, further comprising:
   determining a combined measurement value for a provider UE, of the plurality of provider UEs, using the measurement information, wherein the ranked order and selection of the one or more selected UEs are based at least in part on the combined measurement value.

9. The method of claim 1, wherein the one or more selected UEs are selected based at least in part on the measurement information associated with the one or more selected UEs satisfying a threshold.

10. The method of claim 1, further comprising:
    determining the ranked order based at least in part on the measurement information.

11. The method of claim 1, further comprising:
    determining the measurement information.

12. The method of claim 1, wherein the resource information is received in a control signal.

13. A recipient user equipment (UE) of a sidelink resource sharing system for wireless communication, comprising:
    a memory; and
    one or more processors operatively coupled to the memory, the memory and the one or more processors configured to:
      receive, from a plurality of provider UEs, resource information associated with the plurality of provider UEs;
      select, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; and
      perform a sidelink communication using the one or more resources.

14. The recipient UE of claim 13, wherein the resource information includes respective resource maps associated with the plurality of provider UEs, and wherein selecting the one or more resources further comprises selecting the one or more resources from one or more resource maps, of the respective resource maps, associated with the one or more selected UEs.

15. The recipient UE of claim 13, wherein the one or more processors are further configured to:
    select the one or more selected UEs based at least in part on the ranked order.

16. The recipient UE of claim 13, wherein the one or more selected UEs include a highest-ranked UE according to the ranked order.

17. The recipient UE of claim 13, wherein the one or more selected UEs include a highest-ranked set of UEs according to the ranked order.

18. The recipient UE of claim 17, wherein the one or more resources are selected from a coherent combination of resource information associated with the highest-ranked set of UEs.

19. The recipient UE of claim 13, wherein the measurement information identifies respective reference signal received power (RSRP) values of the plurality of provider UEs.

20. The recipient UE of claim 13, wherein the one or more processors are further configured to:
    determine an average value for a provider UE, of the plurality of provider UEs, using the measurement information, wherein the ranked order and selection of the one or more selected UEs are based at least in part on the average value.

21. The recipient UE of claim 13, wherein the one or more selected UEs are selected based at least in part on the measurement information associated with the one or more selected UEs satisfying a threshold.

22. The recipient UE of claim 13, wherein the one or more processors are further configured to:
- determine the ranked order based at least in part on the measurement information.

23. The recipient UE of claim 13, wherein the resource information is received in a control signal.

24. A non-transitory computer-readable medium storing one or more instructions for wireless communication, the one or more instructions comprising:
- one or more instructions that, when executed by one or more processors of a recipient user equipment (UE) of a sidelink resource sharing system, cause the one or more processors to:
  - receive, from a plurality of provider UEs, resource information associated with the plurality of provider UEs;
  - select, based at least in part on a ranked order and the resource information, one or more resources associated with one or more selected UEs, of the plurality of provider UEs, wherein the ranked order is based at least in part on measurement information, determined by the recipient UE, associated with the plurality of provider UEs; and
  - perform a sidelink communication using the one or more resources.

25. The non-transitory computer-readable medium of claim 24, wherein the resource information includes respective resource maps associated with the plurality of provider UEs, and wherein selecting the one or more resources further comprises selecting the one or more resources from one or more resource maps, of the respective resource maps, associated with the one or more selected UEs.

26. The non-transitory computer-readable medium of claim 24, wherein the one or more instructions, when executed by the one or more processors, further cause the one or more processors to:
- select the one or more selected UEs based at least in part on the ranked order.

27. An apparatus for wireless communication, comprising:
- means for receiving, from a plurality of provider UEs, resource information associated with the plurality of provider UEs;
- means for selecting, based at least in part on a ranked order and the resource information, one or more resources associated with one or more selected UEs, of the plurality of provider UEs, wherein the ranked order is based at least in part on measurement information, determined by the apparatus, associated with the plurality of provider UEs; and
- means for performing a sidelink communication using the one or more resources.

28. The apparatus of claim 27, wherein the resource information includes respective resource maps associated with the plurality of provider UEs, and wherein selecting the one or more resources further comprises selecting the one or more resources from one or more resource maps, of the respective resource maps, associated with the one or more selected UEs.

29. The apparatus of claim 27, further comprising:
- means for selecting the one or more selected UEs based at least in part on the ranked order.

30. The apparatus of claim 27, wherein the one or more selected UEs include a highest-ranked UE according to the ranked order.

* * * * *